(12) United States Patent
Palo et al.

(10) Patent No.: US 7,578,520 B2
(45) Date of Patent: Aug. 25, 2009

(54) AIRBAG MODULE

(75) Inventors: Anders Palo, Gothenburg (SE); Jonas Svantesson, Alingsas (SE)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 11/767,042

(22) Filed: Jun. 22, 2007

(65) Prior Publication Data
US 2008/0007030 A1    Jan. 10, 2008

Related U.S. Application Data

(63) Continuation of application No. PCT/EP2005/012252, filed on Nov. 15, 2005.

(51) Int. Cl.
*B60R 21/16* (2006.01)
(52) U.S. Cl. ................. 280/730.2; 280/730.1
(58) Field of Classification Search .............. 280/730.2, 280/730.1
See application file for complete search history.

(56) References Cited

U.S. PATENT DOCUMENTS

| | | | |
|---|---|---|---|
| 5,746,443 A * | 5/1998 | Townsend ................ | 280/730.2 |
| 5,797,621 A | 8/1998 | Ono et al. | |
| 5,984,348 A * | 11/1999 | Specht et al. ............ | 280/730.2 |
| 6,142,508 A * | 11/2000 | Lewis ....................... | 280/730.2 |
| 7,314,232 B2 * | 1/2008 | Kashiwagi ............... | 280/730.1 |
| 2003/0001364 A1 | 1/2003 | Welch et al. | |
| 2006/0097494 A1 * | 5/2006 | Breed ......................... | 280/731 |
| 2006/0157958 A1 * | 7/2006 | Heudorfer et al. ........ | 280/730.2 |

FOREIGN PATENT DOCUMENTS

| EP | 1426246 | 6/2004 |
|---|---|---|
| JP | 06227344 | 1/2003 |

\* cited by examiner

*Primary Examiner*—Paul N. Dickson
*Assistant Examiner*—Drew J. Brown
(74) *Attorney, Agent, or Firm*—Brinks Hofer Gilson & Lione

(57) ABSTRACT

In at least one embodiment of the present invention, an airbag module for a motor vehicle is provided. The airbag module comprises an airbag, which can be inflated by a gas generator to unfold flat. The airbag is arranged underneath a window pane of the motor vehicle. In the inflated state, the airbag lodges itself in front of the window opening. The airbag module has a protective layer arranged on at least one side of the airbag.

5 Claims, 2 Drawing Sheets

AIRBAG MODULE

CROSS-REFERENCE TO RELATED APPLICATIONS

This application is a continuation of PCT/EP2005/012252, filed 15 Nov. 2005, which claimed priority to DE 10 2004 062 569.7, filed 24 Dec. 2004.

BACKGROUND OF THE INVENTION

The invention relates to an airbag module in a motor vehicle the airbag module comprises an airbag, which can be inflated by a gas generator, and which unfolds flat. The airbag is arranged underneath a window pane of the motor vehicle and, in the inflated state, positions itself in front of the window opening. An airbag module of this type is particularly suitable as a side airbag module to protect a vehicle occupant in a side impact or in a rollover.

An airbag device which, in the folded state, is accommodated in a space in a door or in the passenger compartment in an armrest to the side of a vehicle occupant, is known from DE 42 23 620 A1. A gas generator inflates the airbag in the event of an accident. The inflated airbag occupies a space between the vehicle occupant and the door or the side wall of the vehicle so that the airbag catches the vehicle occupant in the event of an accident, protecting him/her from injury.

An airbag device of this type, also called a side airbag, is activated in the event of high lateral accelerations, which are detected by an acceleration sensor. If these acceleration values exceed a limit, a gas generator, which is triggered in a very short time and inflates the airbag with filling gas, is activated. During the inflation process, a covering or lining tears open at a defined location and opens the path for the airbag being filled with gas.

In the event of an impact, the airbag then protects the occupants from vehicle-body parts and broken glass and from sliding out a destroyed window.

SUMMARY OF THE INVENTION

The object of the present invention is to improve the reliability of a known side airbag.

According to the invention, this object may be achieved by an airbag module having the features disclosed herein.

According to the invention an airbag module is provided in a motor vehicle. The airbag module comprises an unfolding airbag, which can be inflated by a gas generator, and which unfolds itself. The airbag module is arranged underneath a window pane of the motor vehicle and lodges in front of the window opening in the inflated state. The airbag module provides that an additional protective layer is arranged at least on one side of the airbag. When an airbag inflates and unfolds in the vicinity of a vehicle window, there exists the danger that the airbag will be damaged by glass splinters or by other sharp-edged elements that are present. The risk of damage is much larger for an airbag arranged underneath a window opening than for a side airbag arranged in the roof area because the B-pillar guides the latter away from flying glass. The protective layer protects the airbag from being cut and reduces the danger of a cut, thereby increasing the reliability of an airbag module and hence of the safety of the vehicle occupants.

The protective layer is advantageously arranged on the side of the airbag that faces the window when the airbag is in its inflated state because there the risk of the airbag being destroyed by a destroyed window is particularly high.

Particularly advantageous is the arrangement of an airbag in a vehicle door in order to effectively protect the vehicle occupants in the event of a side impact or a rollover. It is provided that the protective layer is configured as a fabric layer which can be stitched onto the airbag or sewn onto the airbag. In a single-sided arrangement of a protective layer, an inflated airbag consists of three fabric layers. In an arrangement of one protective layer each on the inside and outside of the airbag, four fabric layers are present. The protective layer or layers can also be glued on as an alternative to sewing.

In its uninflated state, the airbag can be folded or rolled up. In a rolled-up embodiment, it is preferable that the protective layer envelopes the airbag in its rolled-up state so that the unfolding airbag is protected from sharp-edged objects that can penetrate the break point of the underlying airbag material.

BRIEF DESCRIPTION OF THE DRAWINGS

Example embodiments of the invention will be explained in detail below on the basis of the enclosed figures. The drawing shows.

DETAILED DESCRIPTION OF THE INVENTION

The following description is merely exemplary in nature and is in no way intended to limit the invention or its application or uses.

Figure 1:
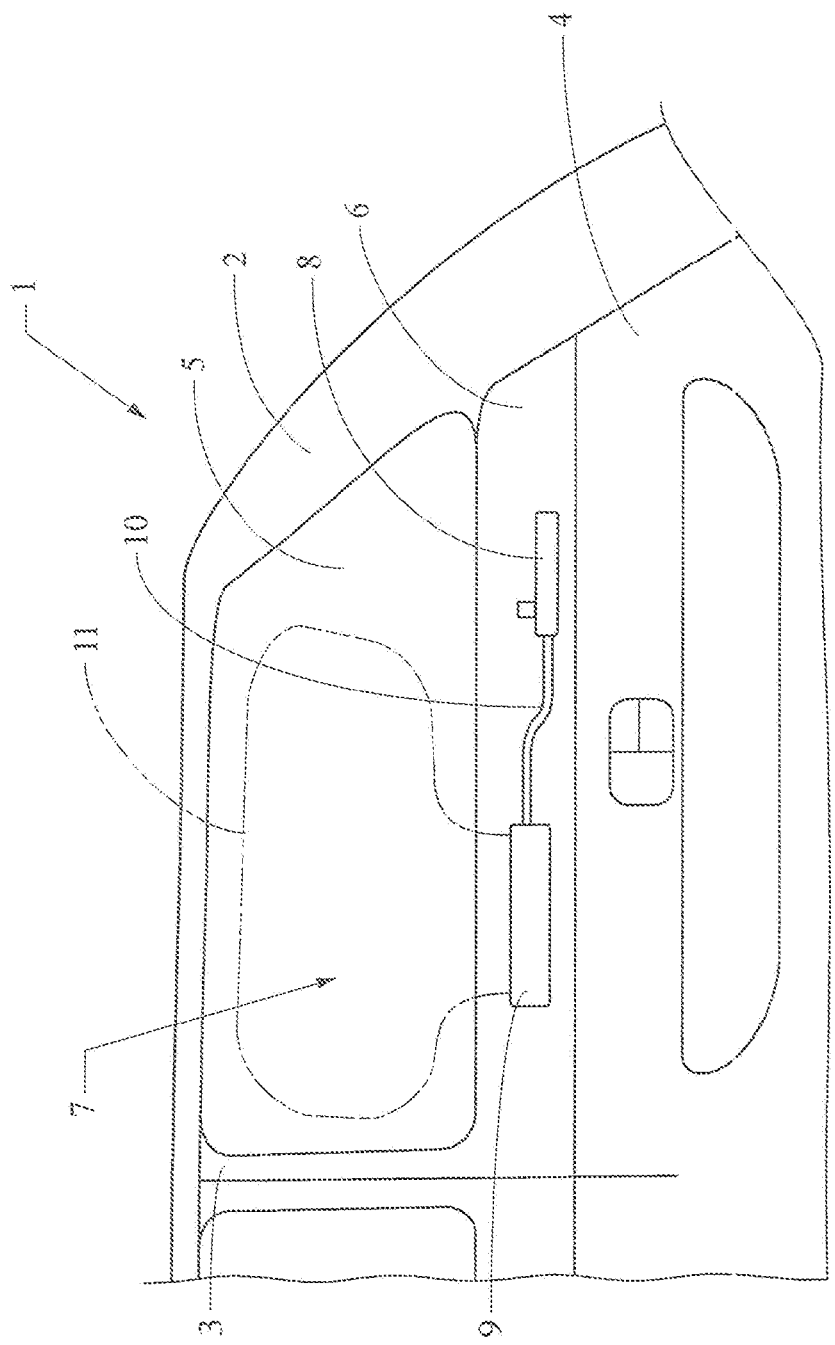
FIG. 1 shows a side view of an airbag module according to the invention.

FIG. 1 depicts a partially illustrated vehicle 1 having an A-pillar 2 and a B-pillar 3, between which a driver's seat (not illustrated) is arranged. A vehicle door 4, which is hingedly mounted on the A-pillar, is arranged in the region between the A-pillar 2 and the B-pillar 3. The vehicle door 4 provides for a door window 5 and a door base 6 arranged thereunder.

Arranged within the door base 6 is an airbag module 7, which essentially comprises a gas generator 8 installed within the door base 6 and an airbag container 9, these being connected to each other by a feed pipe 10. In the event of an abrupt slowdown or high lateral acceleration of the motor vehicle 1, an airbag 11, which emerges from the airbag container 9, is inflated by conducting gas generated in the gas generator 8 through the feed pipe 10 into the airbag 11. In its inflated state, the inflated airbag 11 advantageously extends over substantially the entire window opening of the window 5.

Figure 2:
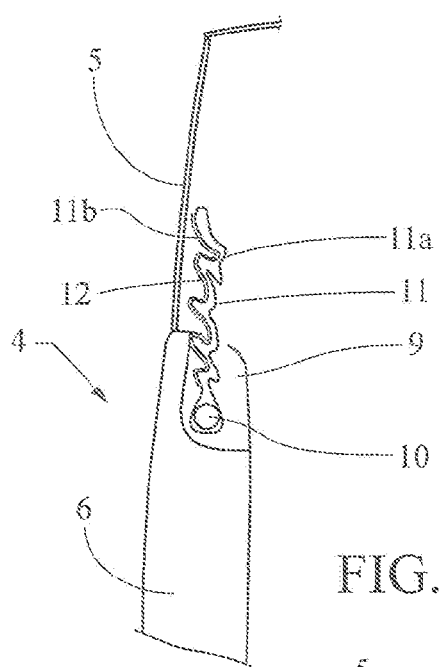
FIG. 2 shows a sectioned view of an unfolding airbag.

A sectioned view of the door 4 is depicted in FIG. 2, from which it can be seen that the airbag container 9, within which the airbag 11 is stored in a folded state until it is activated, is configured within the door base 6. FIG. 2 depicts the airbag 11 in a partially folded state in which it does not yet extend over the entire height of the window 5. The airbag 11 comprises two plies of fabric 11a, 11b, which are either sewn together by a circumferential seam (not illustrated) or are woven into an airbag 11 as one-piece integral construction. Another fabric layer 12, which in the present case is sewn onto the airbag layer 11b, is arranged as a protective layer on the side of the airbag 11 that faces the window 5. In the event of a side impact, there exists the danger that the window 5 will shatter before the airbag 11 has unfolded completely because the tight spatial dimensions will quickly cause the window pane 5 to rupture at high lateral accelerations. Flying glass or other vehicle-body splinters can then damage the unfolding airbag 11. The protective layer 12, preferably a break-proof fabric, will prevent this and effectively protect the airbag 11.

Figure 3:
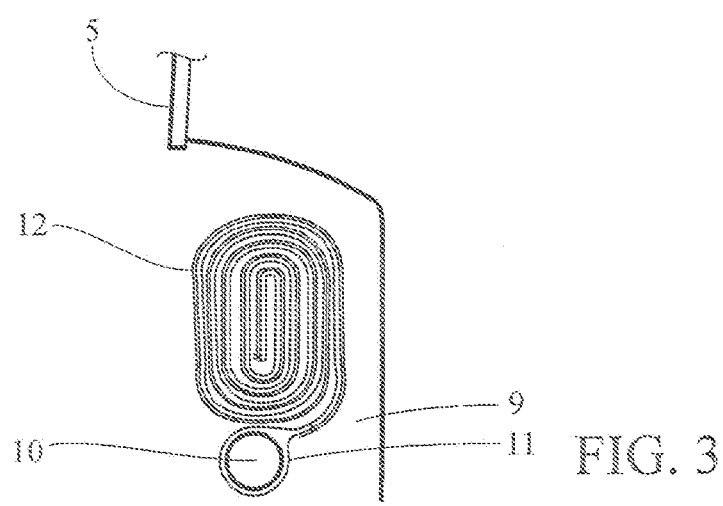
FIG. 3 shows an airbag module according to the invention in a rolled-up state.

FIG. 3 depicts the airbag 11 in a rolled-up state before the feed pipe 10 admits gas from the gas generator 8 into the airbag. In the example embodiment of FIG. 3, the airbag 11 is rolled-up counterclockwise and the protective layer 12 is arranged in such a manner that it envelopes the airbag 11. So configured, the protective layer 12 is facing the window 5 during the unrolling process when the airbag 11 unrolls. After the unrolling, the protective layer 12 or protective fabric is always arranged on the side facing the vehicle occupant.

Figure 4:
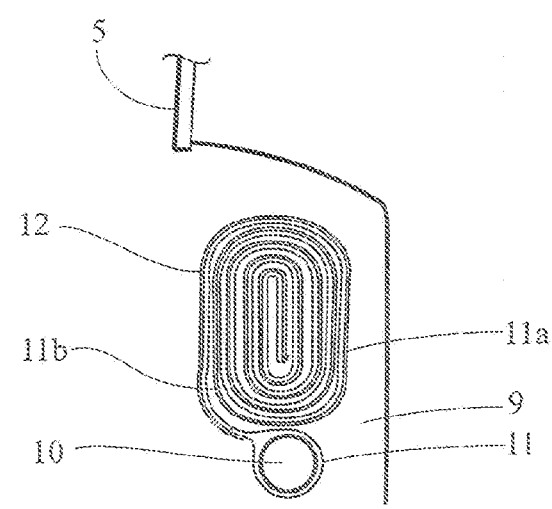
FIG. 4 shows an airbag module according to the invention in an alternative rolled-up state.

FIG. 4 depicts an alternative arrangement in which the airbag 11 is rolled-up clockwise and the protective layer 12 likewise envelopes the airbag 11 in its rolled-up state. During the unrolling process, the protective layer 12 is likewise first guided through an open gap in the airbag container 9 or in the door trim, but continues to face the window 5 after deployment. This provides optimum protection for the airbag 11, both when unfolding and when in its unfolded state, and thereby also for the vehicle occupant. In place of a sewn-on protective layer 12, the protective layer can also be glued-on. The protective layer 12 can be arranged over the entire airbag 11 or on selected regions of the airbag 11, for example if it has been shown that damage is to be expected only in a particular region of the airbag 11.

While the above description constitutes one or more embodiments of the present invention it will be appreciated that the invention is susceptible to modification, variation and change without departing from the proper scope and fair meaning of the accompanying claims.

We claim:

1. An airbag module in a motor vehicle, the airbag module comprising an airbag inflatable by a gas generator to deploy from a rolled-up to an inflated state wherein the airbag unfolds generally flat, and a protective layer covering at least one side of the airbag when in the inflated state, wherein the airbag in the uninflated state is arranged underneath a window pane of the motor vehicle and is enveloped by the protective layer, and wherein the airbag in the uninflated state is rolled-up such that the protective layer faces the window pane during inflation of the airbag to protect the airbag, and faces a vehicle occupant when the airbag is in the inflated state.

2. The airbag module according to claim 1, wherein the airbag is arranged in a vehicle door prior to inflation.

3. The airbag module according to claim 1, wherein the protective layer is configured as a fabric layer.

4. The airbag module according to claim 1, wherein the protective layer is sewn or glued onto the airbag.

5. The airbag module according to claim 1, wherein the airbag is configured to extend entirely across the window pane when in the inflated state.

\* \* \* \* \*

UNITED STATES PATENT AND TRADEMARK OFFICE
CERTIFICATE OF CORRECTION

PATENT NO. : 7,578,520 B2 Page 1 of 1
APPLICATION NO. : 11/767042
DATED : August 25, 2009
INVENTOR(S) : Anders Palo and Jonas Svantesson It is certified that error appears in the above-identified patent and that said Letters Patent is hereby corrected as shown below:

On the Title page, Item (75) under inventors:, after Palo, delete "Gothenburg" and insert --Goteborg--.

Signed and Sealed this

Seventeenth Day of November, 2009

David J. Kappos
*Director of the United States Patent and Trademark Office*